United States Patent
Kajiwara

[15] 3,677,100
[45] July 18, 1972

[54] MIXER

[72] Inventor: Tokuji Kajiwara, 13-13-2-chome, Matsugaya, Taito-ku, Tokyo, Japan

[22] Filed: Nov. 27, 1970

[21] Appl. No.: 92,981

[30] Foreign Application Priority Data

Aug. 19, 1970    Japan..................................45/72610

[52] U.S. Cl.................................................74/660, 259/102
[51] Int. Cl..............................................................F16h 1/28
[58] Field of Search.........................................................74/660

[56] References Cited

UNITED STATES PATENTS

| | | |
|---|---|---|
| 2,457,612 | 12/1948 | Thiel.......................................74/660 |
| 1,905,114 | 4/1933 | Lauterbur et al........................74/660 |
| 1,909,224 | 5/1933 | Schiff......................................74/660 |
| 2,457,533 | 12/1948 | Dehoff....................................74/660 |
| 2,736,535 | 2/1956 | Clark et al..............................74/660 |
| 3,287,981 | 11/1966 | Wolff......................................74/660 |

*Primary Examiner*—C. J. Husar
*Attorney*—Cushman, Darby & Cushman

[57] ABSTRACT

The present invention involves an apparatus for making a rolling circle of epicycloid or hypocycloid with an agitator driven by a single source so as to effectively form as many as possible mixtures, deriving from convective, diffusive or shear mixing, of baking ingredients in a container.

1 Claim, 3 Drawing Figures

DIRECTION OF SELF-ROLLING CIRCLE

DIRECTION OF REVOLVING CIRCLE

36

DIRECTION OF SELF-ROLLING CIRCLE ON THE OUTSIDE

DIRECTION OF REVOLVING CIRCLE

36

MIXER

In a conventional mixer, ingredients are only mixed in a simple manner by the rolling action of an agitator in a bowl. While rather effective in beating materials in the baking process, it is readily seen that the conventional mixer is less effective in forming a variety of complex mixtures of materials.

The following are the objects of this invention:

1. Provide an apparatus which makes a rolling circle with an agitator driven by a single source so as to freely form as many as possible mixtures, deriving from convective, diffusive or shear mixing, of ingredients in a bowl, thereby eliminating the defects of the conventional apparatus.

2. Provide an apparatus in which a rolling circle of epicycloid or hypocycloid is made in a simple manner by the action of the sun gear and star gear operated by a lever.

3. Provide an apparatus in which a rolling circle of hypocycloid is effective in diffusive mixing or shear mixing.

4. Provide an apparatus in which a rolling circle of epicycloid is effective in convective mixing.

5. Provide an apparatus in which a sole agitator can form a variety of mixtures, deriving from convective, diffusive or shear mixing, of ingredients so that thus effectively obtained mixture is reasonably inexpensive.

A description of the invention, by way of preferred example, with reference to the accompanying drawings follows.

THE REFERENCE NUMERAL 1

Figure 1:
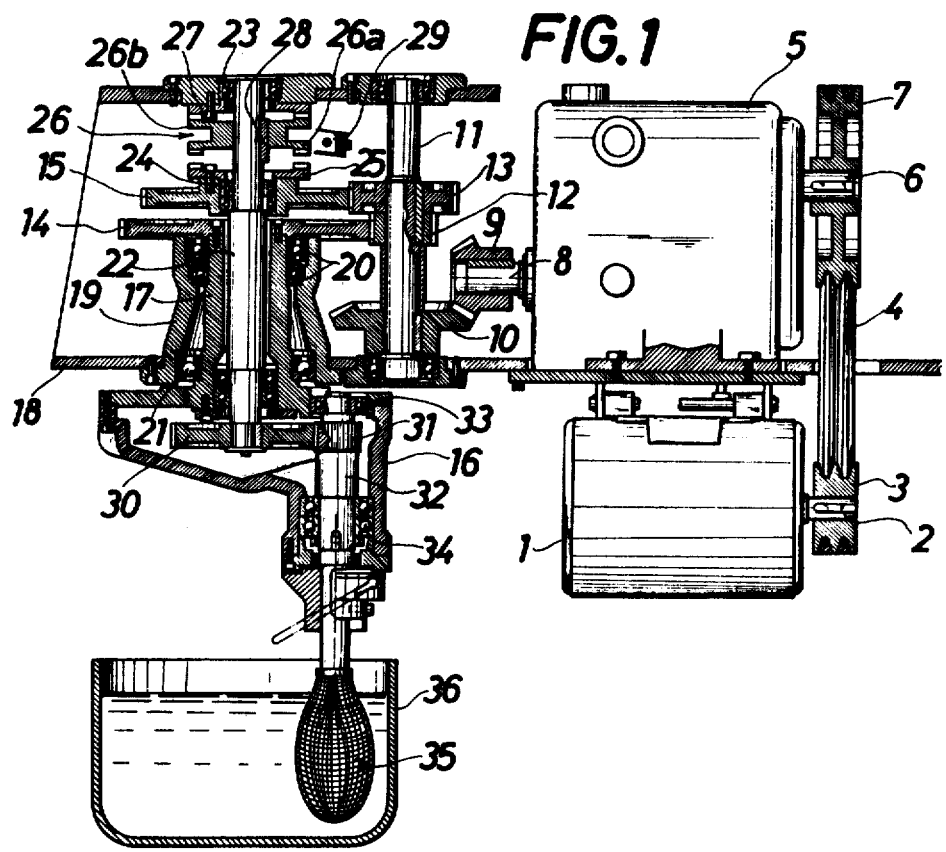
FIG. 1 is a longitudinal and sectional front view of the main part.

Shows the electric motor, wherein through belt 4 the pulley 7 is interlocked to the pulley 3 rigidly secured to the shaft 2 of the electric motor; pulley 7 is rigidly secured to the input shaft 6 of the reduction device 5.

The bevel gear 9 is rigidly secured to the output shaft 8 of the reduction device 5, while being engaged with the bevel gear 10. The said bevel gear 10 is mounted on shaft 11, upon which the pinion 12 and gear 13 are respectively mounted. Pinion 12 is in mesh contact with gear 14, while gear 13 is engaged with the pinion 15. Gear 14 is rigidly secured to the revolving sleeve 17 of the casing 16 by a clamp screw in a similar device. The revolving sleeve 17 is rotatably provided by the bearings 20, 21 on the supporting sleeve 19. In the said revolving sleeve 17 the sun shaft 22 is rotatably inserted. The one end of the said sun shaft 22 (the lowest end shown in FIG. 1) is protruding in the casing 16, while the other end of the said shaft 22 (the upper end shown in FIG. 1) rotatably provided by the bearing 23 on the mixer casing 18.

The said pinion 15 is mounted on the said sun shaft 22 by the bearing 24. The clutch disc 25 is rigidly secured to pinion 15. The one clutch plate 26a of the disc clutch 26 is adapted to be engaged with clutch disc 25, while the other clutch plate 26b is adapted to be engaged with the clutch disc 27 securely mounted on the mixer casing 18. The said disc clutch 26 is designed to operate by the axial motion of the lever 29 which slides a sliding key 28 within the clutch plate 26a along on the shaft in the direction thereof.

The sun gear 30 is mounted on the extreme end of the sun shaft 22 protruding in the said casing 16. The gear 30 is in mesh contact with the star gear 31, being mounted on the agitator shaft 32, which is rotatably provided in the casing 16 by the bearings 33, 34. The lowest end of the agitator shaft 32, as shown in FIG. 1, protrudes a little out of casing 16. The agitator 35 is provided on the said lowest end and is adapted to be removed and replaced. The agitator 35 is put into the bowl 36, thereby having ingredients formed into various kinds of mixtures.

The mixer is subjected to the vertical motion driven by the pinions and racks (not shown in the drawings) so that the agitator 35 is conveniently available inside or outside of bowl 36.

The function of the mixer can be understood as described below with respect to the above described composition of the apparatus.

Figure 2:
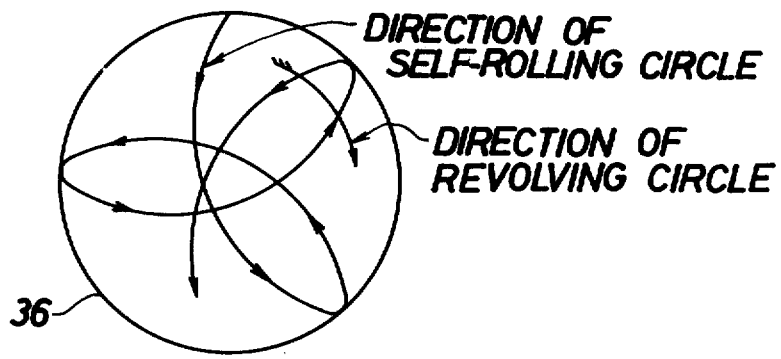
FIG. 2 is a diagram of a hypocycloid curve.

Firstly, the revolving circles of the hypocycloid curves by agitator 35 are as shown in FIG. 2. The clutch plate 26a in the disc clutch 26 is meshed with the clutch disc 25. The revolving force driven by the electric motor 1 is transmitted to the pulley 7 through the belt 4, further being transmitted from the reduction device 5 to the bevel gear 10 through the bevel gear 9. The bevel gear 10 rotates with the shaft 11, which rotates together with the pinion 12 and the gear 13. The driving forces are divided into two systems by the rotation. One system is that the rotating pinion 12 rotates the gear 14, thereby rotating the casing 16. The other system is that the pinion 15 rotates with the rotating gear 13, thereby transmitting the driving force to the sun shaft 22 through the clutch disc 25 and the clutch plate 26a. Thus the transmitting further rotates the sun shaft 22, thereby rotating the sun gear 30. The rotating sun gear 30 further rotates the star gear 31, thereby rotating the agitator shaft 32, so that the agitator 35 rotates itself on the agitator shaft 32, while circulating in the bowl 36 together with the rotating casing 16.

Hence, the agitator 35 rotates itself in the direction opposite to the driving direction of the agitator 35 in the bowl 36, thereby obtaining the rolling circle of the hypocycloid curve as shown in FIG. 1, which comprises a combination of large arcs crossing in the bowl 36 and small arcs suddenly changing directions.

Figure 3:
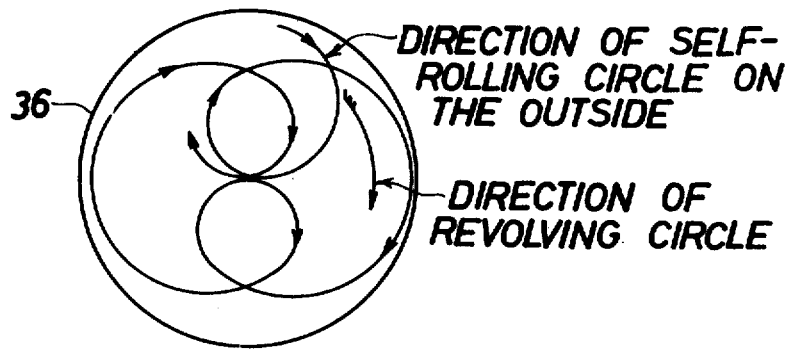
FIG. 3 is a diagram of an epicycloid curve.

Secondly, the revolving circles of the epicycloid curves by agitator 35 are as shown in FIG. 3. The clutch plate 26b in the disc clutch 26 is engaged with the rigidly secured clutch disc 27. Then the gear 13 which is rotated together with the rotating shaft 11 transmits its rotating force to the pinion 15. The latter freely rotates merely around the sun shaft 22. Hence, the sun shaft 22 is in a still condition being out of rotation, thereby causing the sun gear 30 to rest. In this state the rotating force of the pinion 12 rotating together with the shaft 11 is merely transmitted to the gear 14. The gear 14 is rotated by this transmitting, thereby transmitting its rotating force to the casing 16, while further rotating the latter together with itself. The rotating casing 16 rotates the star gear 31 on the periphery of the sun gear 30. Hence, the agitator 35 rotates itself in the same direction as the driving direction of itself within the bowl 36. Thus, the agitator makes a spiral motion which has as many as possible contacts with the inner wall of the bowl 36, consequently obtaining the rolling circles of the epicycloid curves, as shown in FIG. 3.

It is readily seen from the present invention as previously described that there are two different rolling circles available from the sun gear and the star gear operated by a lever motion.

In the case of hypocycloid curves made by the rolling agitator's circles, the self-rolling thereof is in the direction opposite to the revolving direction within the bowl, wherein ingredients in the bowl are put together in s small mass so as to be equally conveyed, partially or together, thereby actuating the diffusive mixing and shear mixing.

In the case of epicycloid curves of the rolling agitator's circles, the self-rolling thereof is in the same direction as the revolving direction within the bowl, wherein ingredients are put together in a large mass so as to be wholly blended, thereby actuating the convective mixing.

It is conveniently possible to form a variety of complicated mixtures by a combination of hypocycloid curves and epicycloid curves.

It should be further understood that the interrelation between the sun gear and the star gear is capable of being replaced by the internal gear.

We claim:

1. Apparatus for driving an agitator through rolling circles of epicycloid curves and hypocycloid curves, for mixing ingredients within a container which receives the agitator, said apparatus including:

a shaft;

means for rotating the shaft about the longitudinal axis thereof;
a primary pinion and a primary gear secured on the shaft;
a sun shaft;
a secondary pinion;
bearing means mounting the secondary pinion on the sun shaft for rotation with respect thereto, said secondary pinion being in meshing engagement with the primary gear;
a support including a supporting sleeve;
bearing means journalling the shaft on the support for rotation;
a revolving sleeve means received within the supporting sleeve;
bearing means journalling the revolving sleeve with respect to the supporting sleeve;
a secondary gear secured on the revolving sleeve means in meshing engagement with the primary pinion;
bearing means journalling the sun shaft, toward one end thereof, with respect to the support and toward the other end thereof with respect to the revolving sleeve means;
bearing means journalling the sun shaft, toward the other end thereof, with respect to the revolving sleeve means;
a sun gear secured on said sun shaft;
an agitator shaft for mounting said agitator;
bearing means journalling the agitator shaft with respect to the revolving sleeve means, said agitator shaft being laterally displaced from said sun shaft;
a star gear secured on said agitator shaft and meshing with said sun gear;
a clutch member including:
  a. first clutch plate means fixed with respect to the secondary pinion;
  b. second clutch plate means fixed with respect to said support;
  c. a clutch disk mounted on said sun shaft for rotation therewith, said clutch disk having a third clutch plate means for engaging the first clutch plate means and a fourth clutch plate means for alternatively engaging the second clutch means;
  d. means for shifting the clutch disk between a first position wherein the first and third clutch plate means are engaged,
    whereupon rotation of said shaft rotates the primary pinion and the secondary gear, thus rotating the revolving sleeve means to move said agitator shaft in a circle about the longitudinal axis of the sun shaft, while said primary gear rotated with said shaft rotates the secondary pinion, thereby rotating the sun gear, star gear and the agitator shaft, so that the agitator shaft rotates about the longitudinal axis thereof in the opposite sense to its rotation about the longitudinal axis of the sun shaft to provide movement of the agitator in rolling circles of hypocycloid curves, and a second position wherein the second and fourth clutch plate means are engaged,
  whereupon rotation of said shaft rotates the primary gear and the secondary pinion, without rotating the sun shaft on which the secondary pinion is mounted, thereby leaving the sun gear at rest, while said primary pinion rotates the secondary gear and the revolving sleeve means, causing the star gear to rotate enmeshed with the stationary sun gear, thus rotating the agitator shaft about the longitudinal axis of the sun shaft in the same sense to the rotation of the agitator about its own longitudinal axis to provide movement of the agitator in rolling circles of epicycloid curves.

* * * * *